(12) United States Patent
van BEEK et al.

(10) Patent No.: US 10,938,089 B2
(45) Date of Patent: Mar. 2, 2021

(54) MILLIMETER WAVE COMMUNICATION THROUGH DEVICE CASE

(71) Applicant: NXP B.V., Eindhoven (NL)

(72) Inventors: Jozef Thomas Martinus van BEEK, Rosmalen (NL); Krishna Tiruchi Natarajan, Cuptertino, CA (US)

(73) Assignee: NXP B.V., Eindhoven (NL)

( * ) Notice: Subject to any disclaimer, the term of this patent is extended or adjusted under 35 U.S.C. 154(b) by 193 days.

(21) Appl. No.: 16/214,839

(22) Filed: Dec. 10, 2018

(65) Prior Publication Data

US 2020/0185814 A1    Jun. 11, 2020

(51) Int. Cl.
| | |
|---|---|
| *H01Q 1/22* | (2006.01) |
| *H04B 1/40* | (2015.01) |
| *H01Q 13/26* | (2006.01) |
| *H01Q 23/00* | (2006.01) |
| *H01Q 19/30* | (2006.01) |

(52) U.S. Cl.
CPC .......... *H01Q 1/2283* (2013.01); *H01Q 13/26* (2013.01); *H01Q 23/00* (2013.01); *H04B 1/40* (2013.01); *H01Q 19/30* (2013.01)

(58) Field of Classification Search
CPC . H01L 2924/00; H01L 23/5227; H01F 38/00; H01Q 1/22; H01Q 1/2283; H01Q 1/24; H01Q 1/243; H01Q 1/38; H01Q 1/52; H01Q 13/26; H01Q 23/00; H04B 1/40
See application file for complete search history.

(56) References Cited

U.S. PATENT DOCUMENTS

| | | | | |
|---|---|---|---|---|
| 5,982,245 | A | * 11/1999 | Matsui | H01Q 9/0407 331/117 D |
| 7,126,151 | B2 | * 10/2006 | Estes | B82Y 10/00 257/25 |
| 7,839,334 | B2 | 11/2010 | Rofougaran | |
| 9,123,737 | B2 | * 9/2015 | Haroun | H01Q 9/0407 |
| 9,608,313 | B2 | * 3/2017 | Kim | H01L 23/66 |
| 2011/0309899 | A1 | * 12/2011 | Leiba | H01Q 23/00 333/208 |
| 2017/0294705 | A1 | * 10/2017 | Khripkov | H01Q 21/24 |

OTHER PUBLICATIONS

J. Vaes, et al., "A PCB-Embedding Scheme for LCP Ribbon Waveguide at D-band," 2018 IEEE/MTT-S International Microwave Symposium—IMS, Philadelphia, PA, pp. 382-385. ( 2018) (doi: 10.1109/MWSYM.2018.8439342).
U. Dey et al., "Concept of a dielectric waveguide-based chip-to-chip multicast interconnect," 2017 IEEE International Symposium on Radio-Frequency Integration Technology (RFIT), Seoul, pp. 156-158. (2017).

* cited by examiner

*Primary Examiner* — Tho G Phan

(57) ABSTRACT

A device, including: a dielectric case or chassis; a first integrated circuit (IC) configured to produce a millimeter wave signal; a first IC antenna configured to receive the millimeter wave signal from the IC and radiate the millimeter wave signal; and a first waveguide configured to guide the radiated millimeter wave signal to the dielectric case, wherein the millimeter wave signal is coupled into to the dielectric case.

22 Claims, 5 Drawing Sheets

MILLIMETER WAVE COMMUNICATION THROUGH DEVICE CASE

TECHNICAL FIELD

Various exemplary embodiments disclosed herein relate generally to millimeter wave communication through a device case.

BACKGROUND

Flex cables are used to connect various electronic parts inside devices such as smart phones, tablets, and laptops. These cables occupy valuable real estate and require manual assembly. The connectors associated with these cables themselves also occupy large amount of printed circuit board (PCB) real estate. Furthermore, the connectors are sensitive to dirt and will wear out when mated many times. In some cases, the cable needs to carry substantial amounts of data e.g., when transferring video data from a camera to the CPU in real-time. These high data rates pose further requirements on cable and connector, such as tight mechanical tolerances and the use of expensive shielding.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a device, including: a dielectric case or chassis; a first integrated circuit (IC) configured to produce a millimeter wave signal; a first IC antenna configured to receive the millimeter wave signal from the IC and radiate the millimeter wave signal; and a first waveguide configured to guide the radiated millimeter wave signal to the dielectric case, wherein the millimeter wave signal is coupled into to the dielectric case.

Various embodiments are described, further including: a second waveguide configured to receive the millimeter wave signal from the dielectric case and to guide the millimeter wave signal from the dielectric case; a second IC antenna configured to receive the millimeter wave signal from the second waveguide; and a second IC configured to receive the millimeter wave signal from the second IC antenna.

Various embodiments are described, wherein the first wave guide is a metalized via through a printed circuit board (PCB).

Various embodiments are described, further including a dielectric case antenna configured to couple the millimeter wave signal from the first waveguide into the dielectric case.

Various embodiments are described, wherein the first IC is mounted on a first surface of the PCB, a second surface of the PCB is mounted on the dielectric case, and the first IC antenna is mounted between the first IC and the PCB, wherein the first IC antenna aligns with the first waveguide.

Various embodiments are described, wherein the dielectric case antenna is one of a dipole antenna, a patch antenna, a Yagi-Uda antenna, and a Vivaldi antenna.

Various embodiments are described, wherein the first waveguide is a dielectric waveguide.

Various embodiments are described, further including a dielectric case antenna configured to couple the millimeter wave signal from the first waveguide into the dielectric case.

Various embodiments are described, wherein the first IC is mounted on the PCB, the first IC antenna is mounted between the first IC and the PCB, wherein the first IC antenna aligns with the first waveguide, and the first waveguide is between the PCB and the dielectric case.

Various embodiments are described, wherein the first waveguide is a dielectric waveguide tilted at a tilt angle from an axis perpendicular to the dielectric case, wherein the tilt angle is greater than a critical angle of the dielectric case.

Various embodiments are described, wherein the first IC is mounted on the PCB, the first IC antenna is mounted between the first IC and the PCB, wherein the first IC antenna aligns with the first waveguide, and the first waveguide is between the PCB and the dielectric case.

Various embodiments are described, wherein a first side the first IC is mounted on the PCB, the first IC antenna is mounted a second side of the first IC, wherein the first IC antenna aligns with the first waveguide, and the first waveguide is between the first IC and the dielectric case.

Various embodiments are described, wherein the first IC antenna is one of a dipole antenna, a patch antenna, a Yagi-Uda antenna, and a Vivaldi antenna.

Various embodiments are described, wherein dielectric case is about 1 mm to 2 mm thick.

Various embodiments are described, further including a hybrid connector including: a second IC configured to produce/receive a millimeter wave signal; a hybrid connector antenna connected to the second IC configured to radiate/receive the millimeter wave signal; and a hybrid connector waveguide configured to guide the radiated/received millimeter wave signal from/to the dielectric case.

Various embodiments are described, wherein the hybrid connector has a galvanic connector configured to provide/receive power to a connector in the dielectric case.

Further various embodiments relate to a hybrid connector for connecting to a device with a dielectric case, including: an integrated circuit (IC) configured to produce/receive a millimeter wave signal; an antenna connected to the IC configured to radiate/receive the millimeter wave signal; and a hybrid connector waveguide configured to guide the radiated/received millimeter wave signal from/to the dielectric case to facilitate the communication between the hybrid connector and an IC in the device.

Various embodiments are described, further including a galvanic connector configured to provide/receive power to a connector in the device.

Various embodiments are described, wherein the antenna is one of a dipole antenna, a patch antenna, a Yagi-Uda antenna, and a Vivaldi antenna.

Various embodiments are described, wherein the hybrid connector waveguide is tilted at a tilt angle from an axis perpendicular to the dielectric case, wherein the tilt angle is greater than a critical angle of the dielectric case.

Various embodiments are described, further including a dielectric case antenna configured to couple the millimeter wave signal from the hybrid connector waveguide into the dielectric case.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
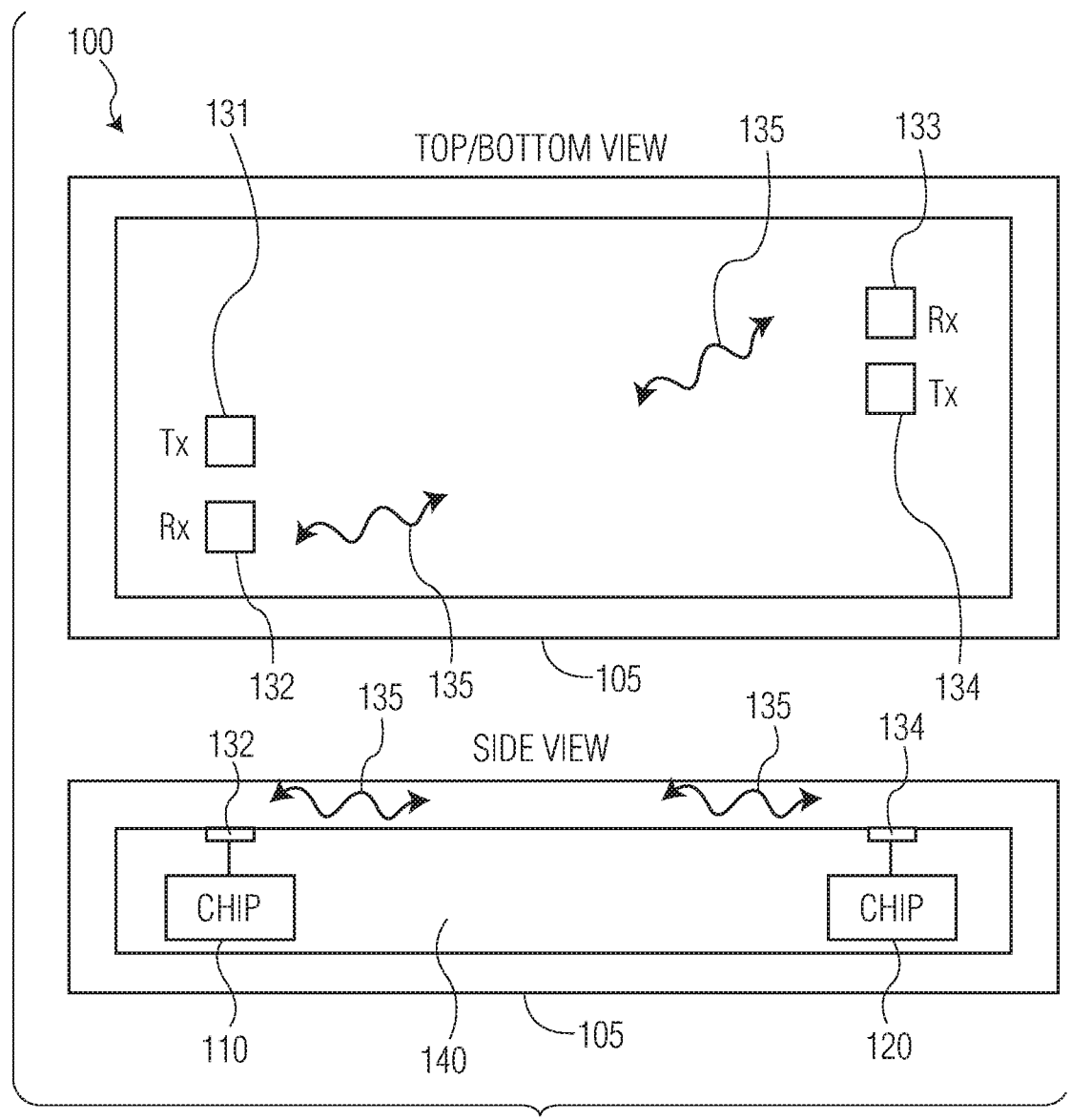
FIG. 1 illustrates a top/bottom view and a side view of a millimeter wave communication system using a dielectric case.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Flex cables are used to connect various electronic parts inside devices such as smart phones, tablets, and laptops. These cables occupy valuable real estate and require manual assembly. The connectors associated with these cables themselves also occupy large amount of printed circuit board (PCB) real estate. Furthermore, the connectors are sensitive to dirt and will wear out when mated many times. In some cases, the cable needs to carry substantial amounts of data e.g., when transferring video data from a camera to the CPU in real-time. These high data rates pose further requirements on cable and connector, such as tight mechanical tolerances and the use of expensive shielding.

One way to overcome these disadvantages is to use a short-range wireless connection. Radios operating at millimeter wave frequencies are especially suited for this purpose, because they can operate using small millimeter sized antennas that may be integrated on-chip, inside the chip's package, or on a PCB. Furthermore, high data rates may be supported because of large available bandwidth in the millimeter wave frequency regions. However, a disadvantage of over-the-air mm-wave communication is that large part of the transmit power is lost due to non-directionality of the antenna. This may be avoided using dielectric waveguide structures that guide the radio signal from the transmitter to the receiver. These waveguides have relaxed connector tolerances and low assembly cost, but will not save on occupied real-estate versus a wired connection, because the diameter of such waveguides is a few millimeters and must match the wavelength of the millimeter wave signal. The space occupied by these waveguides can be reduced through integration inside the PCB. However, this approach still consumes PCB real estate and cannot be used for PCB-to-PCB communication.

The embodiments disclosed herein describe the use of the device non-conductive case or chassis to guide millimeter wave radio signals and thereby establishing a communication channel between different electronic sub-systems residing inside the case or in close proximity to the chassis. The case or chassis, or parts of it, may function as a dielectric waveguide when following conditions are met: the case or chassis includes a non-conducting dielectric material, such as plastic, glass, or ceramic and is surrounded by a material with a lower dielectric constant e.g., air, or a metal; the thickness of the case is comparable to or larger than the wavelength of the millimeter wave signal to efficiently couple the millimeter wave signal into the waveguide; the case or chassis surface has sufficiently low curvature to keep the leakage, that is associated with waveguide bending, of the electro-magnetic (EM) field low.

FIG. 1 illustrates a top/bottom view and a side view of a millimeter wave communication system using a dielectric case. The millimeter wave communication system 100 includes a case 105, first and second chips 110 and 120, antennas 131, 132, 133, and 134, and internal area 140. The case 105 is made of any dielectric material that has a thickness allowing for the propagation millimeter wave signals as described elsewhere herein. The internal area 140 may include a first chip 110 and a second chip 120 that need to communicate with one another. Antennas 131, 131, 133, 134 may be connected to chips 110 and 120 respectively. Antennas 131 and 134 may be transmit antennas, and antennas 132 and 133 may be receive antennas. The antennas 131, 132, 133, and 134 may interface with the dielectric case 105 to couple a millimeter wave communication signal 135 from the chips 110 into the dielectric case 105. The antennas be of various designs including a dipole, a patch, Yagi-Uda, Vivaldi, etc. The millimeter wave communication system 100 may establish a multi-point link connecting various transmitters to a single receiver and vice-versa. Several communication channels may operate over the same case and be separated using known radio communication techniques such as frequency, time, spatial, and/or code division multiplexing.

The advantage of this system and method is that no additional real estate is required to establish the communication channel. Furthermore, the EM field is constrained to the case thereby eliminating signal loss associated with free-space propagation, allowing for energy efficient and reliable operation due to a high signal to noise ratio (SNR). This system and method might greatly reduce or even eliminate the need for manual assembly (which is typically needed to install and connect the cables), because mechanical connections between PCBs and other sub-systems may be eliminated using millimeter wave communication through the dielectric case. High data rates may be supported because of the large bandwidth available at millimeter wave frequencies.

The dielectric case or chassis may be idealized as a dielectric slab that guides the EM field. To do so, the dielectric slab needs to have a certain thickness. This thickness should be large enough so that the electric field is predominantly concentrated inside the dielectric slab. On the other hand, its thickness should not be too large to minimize the number of EM modes that are supported. A large number of supported modes will lead to dispersion and will ultimately lead to inter-symbol interference limiting maximum achievable data rate that may be used over the dielectric case.

Figure 2:
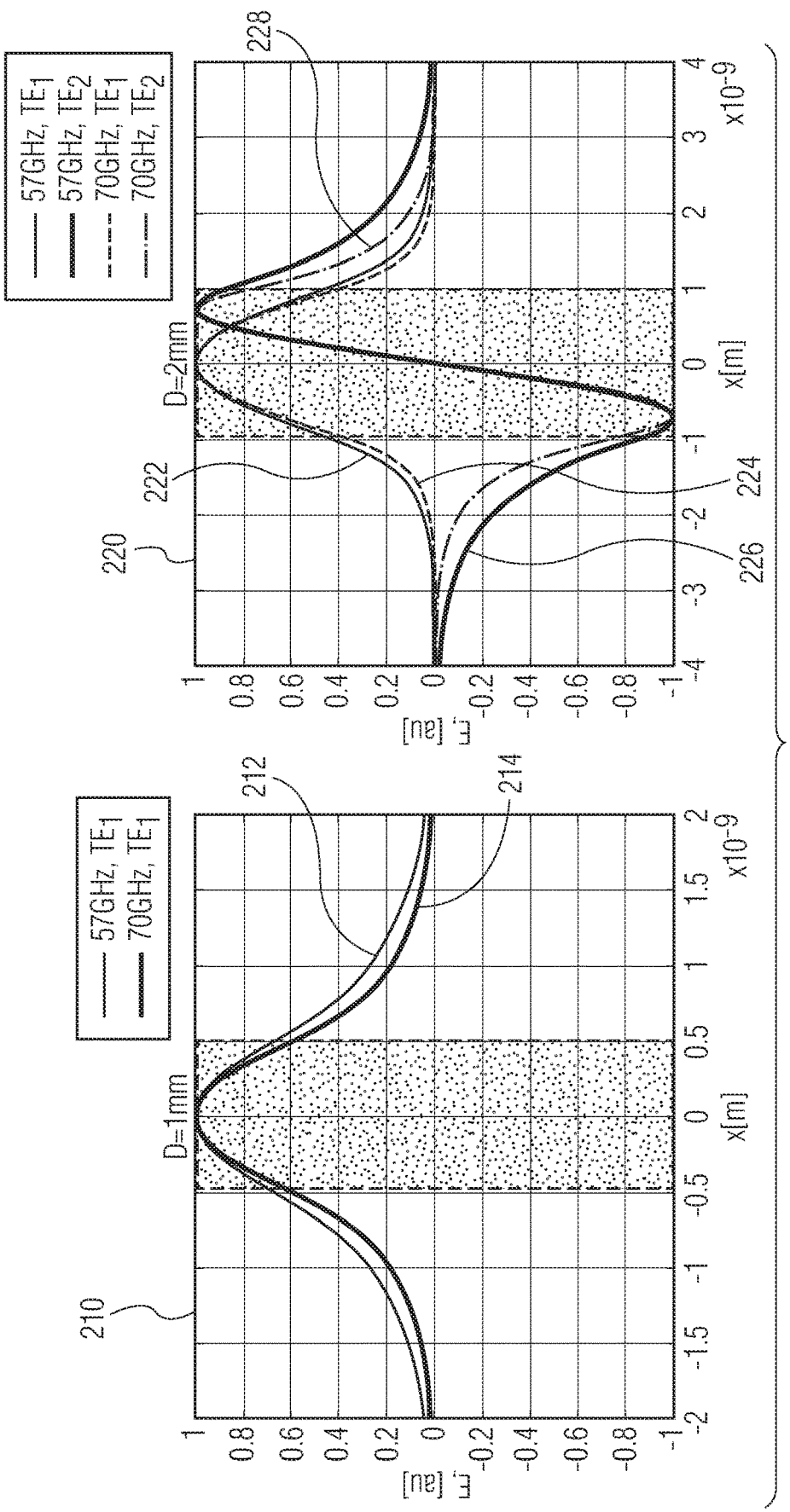
FIG. 2 illustrates the mode shape at 57 GHz and 70 GHz along the thickness of the waveguide for a dielectric case thickness of 1 mm and 2 mm.

By way of illustration, consider WiGig communication using the IEEE 802.11ad protocol. WiGig occupies a frequency band between 57-70 GHz and supports data rates up to 10 Gbps. It is intended to be used for over the air communication over a distance of up to 10 m, but might also be applied to waveguide communication as is described herein. At these frequencies, modes are excited inside the dielectric slab with a thickness of about one millimeter. FIG. 2 illustrates the mode shape at 57 GHz and 70 GHz along the thickness of the waveguide for a dielectric case thickness of 1 mm and 2 mm. The dielectric material of the case is assumed to be made of an alkaline glass. Alkaline glass has a dielectric constant $\epsilon_r$=5.3 at mm-wave frequencies. Only a single TE1 mode 212 and 214 can propagate for a sheet thickness of 1 mm, as is shown in the plot 210. A major part of the field is concentrated inside the dielectric, but part of the field extends outside the dielectric up to a distance of approximately 1 mm from the center of the dielectric. When the sheet thickness is increased to 2 mm the TE2 mode 226 and 228 also is able to exist with the TE1 mode 222 and 224, as is shown in plot 220. Because only 2 modes are supported with a 2 mm thickness, the amount of intermodal dispersion will be limited but will get worse if the thickness is further increased resulting in additional modes. As a rule of thumb, the ideal case dielectric thickness should be equal to about half the wavelength of the millimeter wave signal, which is in the order of one or two millimeters for millimeter waves.

Figure 3:
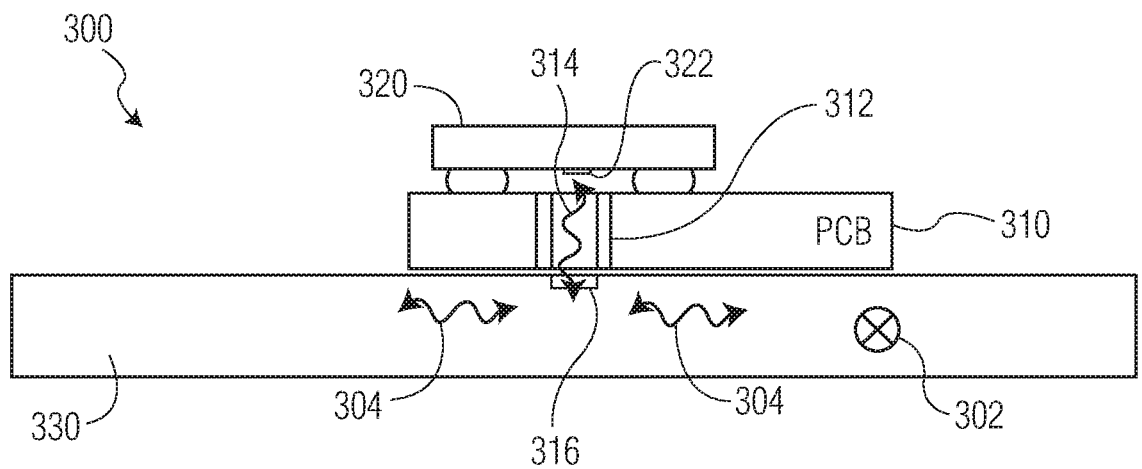
FIG. 3 illustrates a transceiver with a first embodiment of a millimeter wave signal guiding structure.

Antenna structures need to be in place that guide the millimeter wave signal from an integrated circuit (IC) to the dielectric case or chassis. FIG. 3 illustrates a transceiver with a first embodiment of a millimeter wave signal guiding structure. The transceiver 300 includes an IC 320, IC antenna 322, PCB 310, a metalized via 312, and a dielectric case antenna 316. In this first embodiment the PCB 310 is in contact with or very near the dielectric case 330. The IC 320 generates a millimeter wave signal which is coupled into the IC antenna 322. The IC antenna 322 radiates the millimeter wave signal 314 into the metalized via 312 through the PCB 310, which guides the millimeter wave signal 314 towards the dielectric case 330. A dielectric case antenna 316 receives the millimeter wave signal 314 from the metalized via 312 and converts the EM mode inside the metalized via 312 to the mode(s) supported by the dielectric case 330 resulting in a millimeter wave signal 304 propagating in the dielectric case 330. The metalized via 312 acts as a waveguide. The electric field direction 302 is indicated for the dielectric case 330. Alternatively, millimeter wave signals in the dielectric case 330 transmitted from other ICs coupled to the dielectric case 330 may be received by the IC 320 via the dielectric case antenna 316, the metalized via 312, and the IC antenna 322. The dielectric case antenna 316 and IC antenna 322 may be of various designs including a dipole, a patch, Yagi-Uda, Vivaldi, etc.

Figure 4:
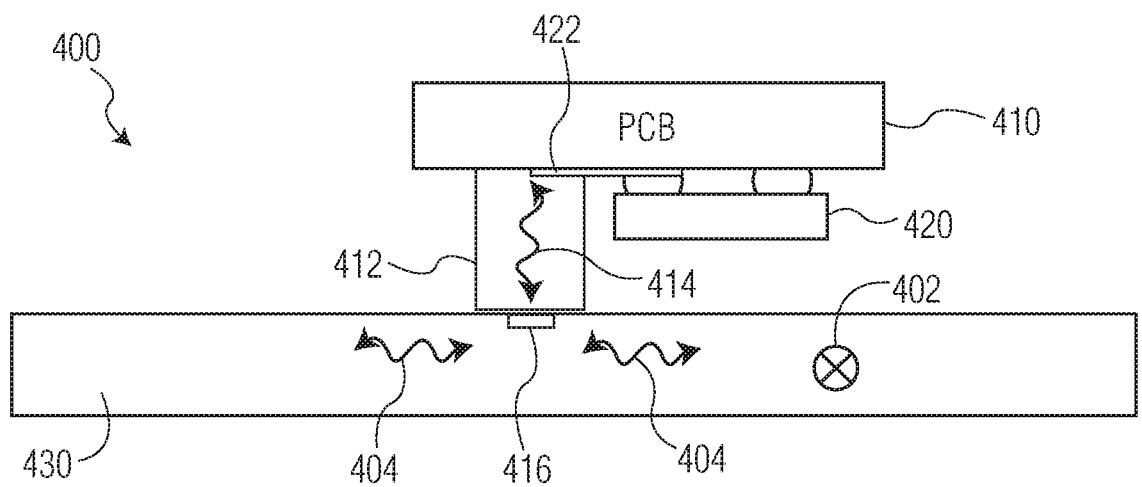
FIG. 4 illustrates a transceiver with a second embodiment of a millimeter wave signal guiding structure.

FIG. 4 illustrates a transceiver with a second embodiment of a millimeter wave signal guiding structure. The transceiver 400 includes an IC 420, PCB antenna 422, PCB 410, a dielectric waveguide 412, and a dielectric case antenna 416. In this second embodiment the PCB 410 is separated from the dielectric case 430. The IC 420 generates a millimeter wave signal which is coupled into the PCB antenna 422. The PCB antenna 422 radiates the millimeter wave signal 414 into the dielectric waveguide 412, which guides the millimeter wave signal 414 towards the dielectric case 430. The dielectric waveguide 412 may be made from low cost plastic and does not require critical alignment. The opposite end of the dielectric waveguide 412 contacts or is in close proximity with the dielectric case 430. A dielectric case antenna 416 receives the millimeter wave signal 414 from the dielectric waveguide 412 and converts the EM mode inside the dielectric waveguide 412 to the mode(s) supported by the dielectric case 430 resulting in a millimeter wave signal 404 propagating in the dielectric case 430. The electric field direction 402 is indicated for the dielectric case 430. Alternatively, millimeter wave signals in the dielectric case 430 transmitted from other ICs coupled to the dielectric case 430 may be received by the IC 420 via the dielectric case antenna 416, the dielectric waveguide 412, and the PCB antenna 422. The dielectric case antenna 416 and PCB antenna 422 may be of various designs including a dipole, a patch, Yagi-Uda, Vivaldi, etc.

One drawback of the concepts shown in FIGS. 3 and 4 is that millimeter wave signals are launched substantially perpendicular to the surface of the dielectric case 330 or 430. This necessitates the use of the dielectric case antennas 316 and 416 at the dielectric case interface to efficiently convert out-of-plane modes emanating from the dielectric waveguide 412 or metalized via 312 into in-plane modes that will propagate into the dielectric case 330 or 430. This may be avoided when the millimeter wave signal that is launched into the dielectric case is launched at an angle that is larger than the critical angle. In such a situation, the millimeter wave entering the dielectric case experiences total internal reflection when in enters the dielectric case and energy leakage is avoided. The critical angle is given by, $$\theta_c = \sin^{-1}\frac{n_1}{n_2}$$

where $n_1$ and $n_1$ are the refractive indices for the higher and lower refractive index materials respectively. For a dielectric slab made from alkaline glass with $n_2=\sqrt{\epsilon_r}=2.3$ surrounded by air with $n_1=1$, the critical angle is $\theta_c=28.4°$. The critical angle is measured from an axis perpendicular to the surface of the material.

Now two embodiments will be described that illustrate structures with a millimeter wave launch angle θ that results in the total internal reflection inside the dielectric case. Both embodiments use a tilted dielectric waveguide where the tilt angle is greater than the critical angle, i.e., $\theta>\theta_c$.

Figure 5:
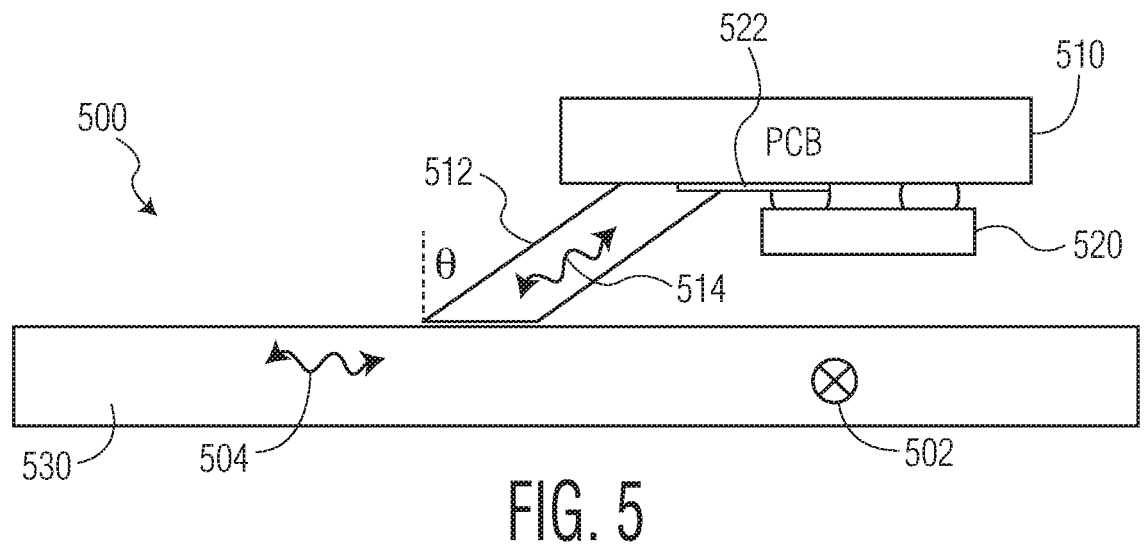
FIG. 5 illustrates a transceiver with a third embodiment of a millimeter wave signal guiding structure.

FIG. 5 illustrates a transceiver with a third embodiment of a millimeter wave signal guiding structure. The transceiver 500 includes an IC 520, PCB antenna 522, PCB 510, and a dielectric waveguide 512. In this third embodiment the PCB 510 is separated from the dielectric case 530, and the PCB antenna 522 is on the PCB 510. The IC 520 generates a millimeter wave signal which is coupled into the PCB antenna 522. The PCB antenna 522 radiates the millimeter wave signal 514 into the dielectric waveguide 512 which is tilted by an angle θ from an axis perpendicular to the dielectric case 530. The dielectric waveguide 512 guides the millimeter wave signal 514 towards the dielectric case 530. The dielectric waveguide 512 may be made from low cost plastic and does not require critical alignment. The opposite end of the dielectric waveguide 512 contacts or is in close proximity with the dielectric case 530. Because the tilt angle of the dielectric waveguide 512 is greater than the critical angle (i.e., $\theta>\theta_c$), the millimeter wave 514 from the dielectric waveguide 512 couples into the dielectric case 530 and propagates as a millimeter wave 504 in the dielectric case 530. The electric field direction 502 is indicated for the dielectric case 530. Alternatively, millimeter wave signals in the dielectric case 530 transmitted from other ICs coupled to the dielectric case 530 may be received by the IC 520 via the dielectric waveguide 512 and the PCB antenna 522. The PCB antenna 522 may be of various designs including a dipole, a patch, Yagi-Uda, Vivaldi, etc.

Figure 6:
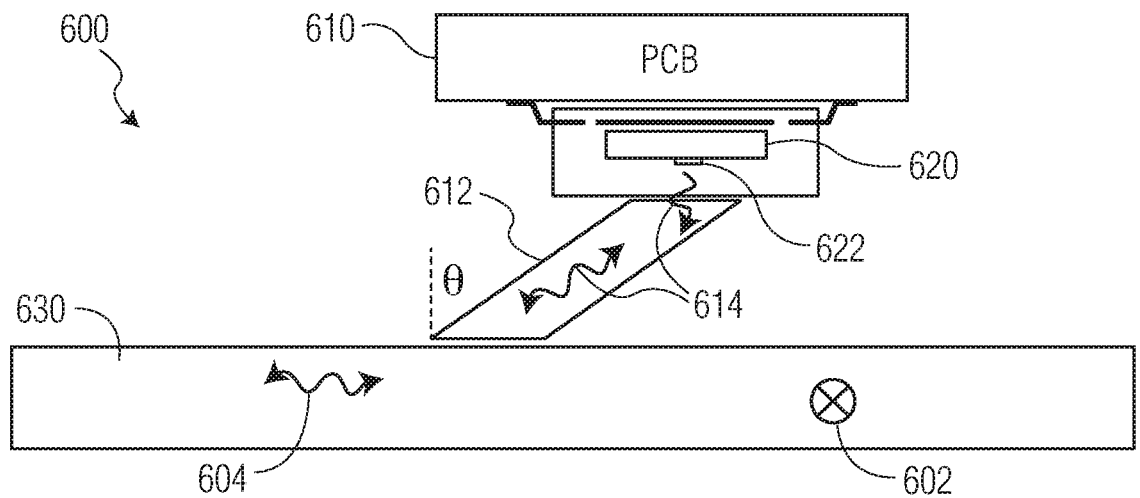
FIG. 6 illustrates a transceiver with a fourth embodiment of a millimeter wave signal guiding structure.

FIG. 6 illustrates a transceiver with a fourth embodiment of a millimeter wave signal guiding structure. The transceiver 600 includes an IC 620, IC antenna 622, PCB 610, and a dielectric waveguide 612. In this fourth embodiment the PCB 610 is separated from the dielectric case 630, and the IC antenna 622 is on the IC 620. The IC 620 generates a millimeter wave signal which is coupled into the IC antenna 622. The IC antenna 622 radiates the millimeter wave signal 614 into the dielectric waveguide 612 which is tilted by an angle θ from an axis perpendicular to the dielectric case 630. The dielectric waveguide 612 guides the millimeter wave signal 614 towards the dielectric case 630. The dielectric waveguide 612 may be made from low cost plastic and does not require critical alignment. The opposite end of the dielectric waveguide 612 contacts or is in close proximity with the dielectric case 630. Because the tilt angle of the dielectric waveguide 612 is greater than the critical angle (i.e., $\theta > \theta_c$), the millimeter wave 614 from the dielectric waveguide 612 couples into the dielectric case 630 and propagates as a millimeter wave 604 in the dielectric case 630. The electric field direction 602 is indicated for the dielectric case 630. Alternatively, millimeter wave signals in the dielectric case 630 transmitted from other ICs coupled to the dielectric case 630 may be received by the IC 620 via the dielectric waveguide 612 and the IC antenna 622. The IC antenna 622 may be of various designs including a dipole, a patch, Yagi-Uda, Vivaldi, etc.

Guided propagation in a dielectric waveguide has the advantage over free-space propagation because for guided propagation the transmitted energy is constrained in the waveguide and therefore will result in more energy reaching the antenna as compared to antennas emitting in free space. This results in a higher effective antenna gain using the dielectric waveguide. Consider a dielectric slab with thickness, t on which a transmitter and receiver are separated by a distance, R, the antenna gain, G that results from the EM guiding of the dielectric slab may be expressed as, $$G = \frac{4\pi R^2}{2\pi R t} = \frac{2R}{t}.$$

Assuming a typical dimension of a smart phone R≈10 cm and t≈2 mm results in an antenna gain of 20 dBi, which clearly illustrates the large link gain that may be achieved with a dielectric case guided communication link.

Figure 7:
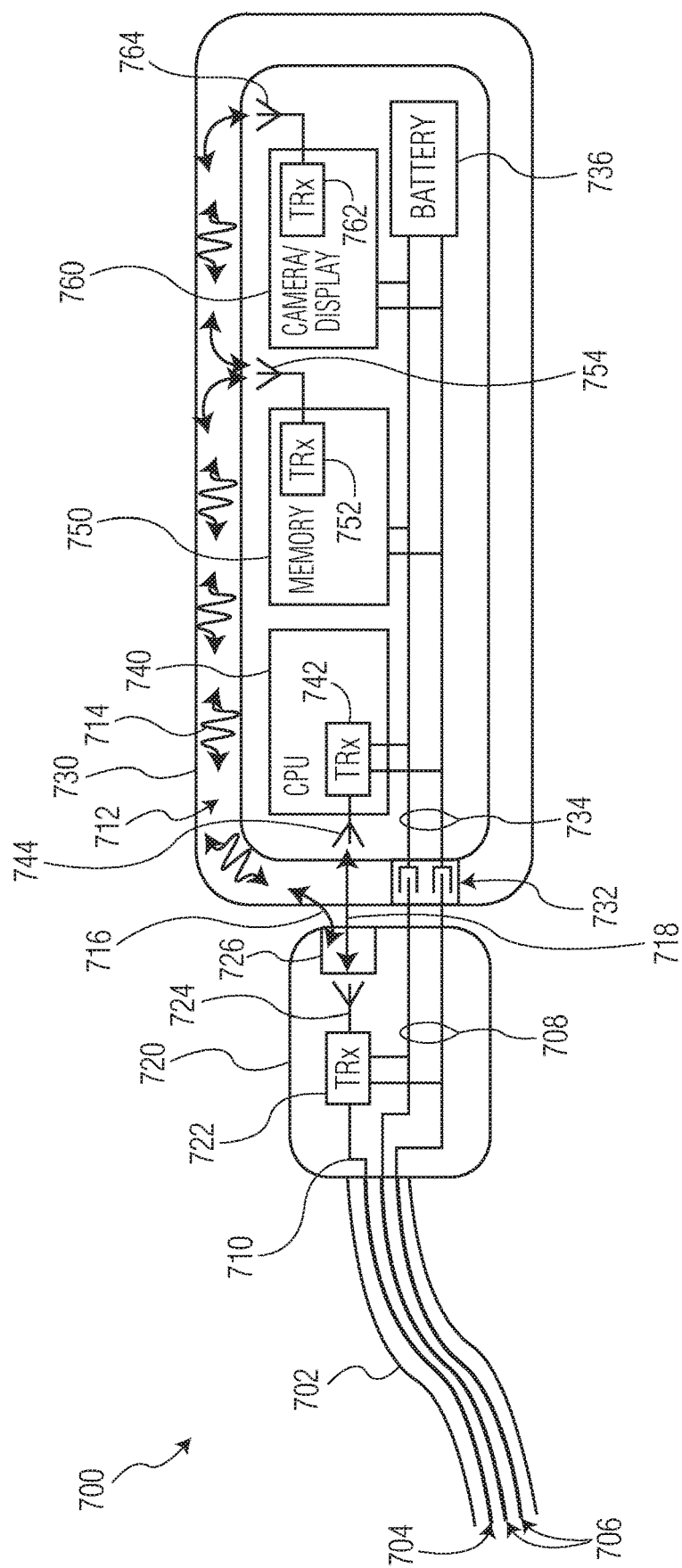
FIG. 7 illustrates the use of a hybrid connector with the millimeter wave communication using the dielectric case.

FIG. 7 illustrates the use of a hybrid connector with the millimeter wave communication using the dielectric case. A hybrid connector 720 uses both a wired galvanic connections as well as wireless connections to transmit data to a device 730. Various embodiments of hybrid connectors are disclosed in copending patent application 16/214,657 entitled "HYBRID CONNECTOR FOR HIGH SPEED WIRELINE COMMUNICATION" filed on Dec. 10, 2018, which is hereby incorporated by reference for all purposes as if fully set forth herein. A data cable 700 includes wires 702 and hybrid connector 720. The wires 702 may include data lines 704 and power lines 706. In some embodiments lines 706 may also include data lines. The hybrid connector 720 may include a transmitter/receiver (TRx) 722 and antenna 724 that are used to communicate wirelessly. The hybrid connector 724 may also include a dielectric waveguide 726 that couples the millimeter wave signal 716 emitted from the antenna 724 into the dielectric case of device 730. Further, the millimeter wave signal 718 from the antenna may propagate directly to the antenna 744 of a CPU 740.

The device 730 may include a CPU 740, memory 750, and camera/display 760, dielectric case 712, galvanic connectors 732, and battery 736. The CPU 740 includes a TRx 742 and antenna 744. The memory includes a TRx 752 and an antenna 754. The camera/display includes a TRx 762 and antenna 764. In this embodiment, each of the CPU 740, the memory 750, and the camera/display 760 may communicate with one another as well as with the hybrid connector via the dielectric case 712. Each of the antennas 742, 752, and 762 may interface with the dielectric case 712 using one of the embodiments described elsewhere herein. The galvanic connection 732 is illustrated as providing/receiving power to/from the hybrid connector 720, but in other embodiments the wires 734 may also carry data if additional data bandwidth is more important than the space that wiring takes up in device 730. In one embodiment of the hybrid connector, the dielectric waveguide 726 may be tilted as described above. In another embodiment of the hybrid connector, a PCB case antenna (not shown) may be used to help couple the millimeter wave signal 714 into the dielectric case 712.

The embodiment of FIG. 7 allows for a hybrid connector to use a wireless connection to communicate with the device 730. Such communication may be via the dielectric case 712 as described in the embodiments above. Such an approach will allow for a data cable to be connected to the device 730 in such a way as to reduce the need for wired distribution of data from the data cable to various elements of the device 730. This has the advantage of reducing the number of internal cables in device 730 as described above.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A device, comprising:
    a dielectric case or chassis;
    a first integrated circuit (IC) configured to produce a millimeter wave signal;
    a first IC antenna configured to receive the millimeter wave signal from the IC and radiate the millimeter wave signal; and
    a first waveguide configured to guide the radiated millimeter wave signal to the dielectric case,
    wherein the millimeter wave signal is coupled into the dielectric case; and
    wherein the case or chassis includes an inside portion configured to enclose a portion of the first integrated circuit.

2. The device of claim 1, further comprising:
    a second waveguide configured to receive the millimeter wave signal from the dielectric case and to guide the millimeter wave signal from the dielectric case;

a second IC antenna configured to receive the millimeter wave signal from the second waveguide; and
a second IC configured to receive the millimeter wave signal from the second IC antenna.

3. The device of claim 1,
wherein the first wave guide is a metalized via through a printed circuit board (PCB).

4. The device of claim 3, further comprising
a dielectric case antenna configured to couple the millimeter wave signal from the first waveguide into the dielectric case.

5. The device of claim 4, wherein
the first IC is mounted on a first surface of the PCB,
a second surface of the PCB is mounted on the dielectric case, and
the first IC antenna is mounted between the first IC and the PCB, wherein the first IC antenna aligns with the first waveguide.

6. The device of claim 4,
wherein the dielectric case antenna is one of a dipole antenna, a patch antenna, a Yagi-Uda antenna, and a Vivaldi antenna.

7. The device of claim 1,
wherein the first waveguide is a dielectric waveguide.

8. The device of claim 7, further comprising
a dielectric case antenna configured to couple the millimeter wave signal from the first waveguide into the dielectric case.

9. The device of claim 8, wherein
the first IC is mounted on the PCB,
the first IC antenna is mounted between the first IC and the PCB, wherein the first IC antenna aligns with the first waveguide, and
the first waveguide is between the PCB and the dielectric case.

10. The device of claim 1,
wherein the first waveguide is a dielectric waveguide tilted at a tilt angle from an axis perpendicular to the dielectric case,
wherein the tilt angle is greater than a critical angle of the dielectric case.

11. The device of claim 10, wherein
the first IC is mounted on the PCB,
the first IC antenna is mounted between the first IC and the PCB, wherein the first IC antenna aligns with the first waveguide, and
the first waveguide is between the PCB and the dielectric case.

12. The device of claim 10, wherein
a first side the first IC is mounted on the PCB,
the first IC antenna is mounted a second side of the first IC, wherein the first IC antenna aligns with the first waveguide, and
the first waveguide is between the first IC and the dielectric case.

13. The device of claim 1,
wherein the first IC antenna is one of a dipole antenna, a patch antenna, a Yagi-Uda antenna, and a Vivaldi antenna.

14. The device of claim 1, wherein dielectric case is about 1 mm to 2 mm thick.

15. The device of claim 1, further comprising
a hybrid connector including:
  a second IC configured to produce/receive a millimeter wave signal;
  a hybrid connector antenna connected to the second IC configured to radiate/receive the millimeter wave signal; and
  a hybrid connector waveguide configured to guide the radiated/received millimeter wave signal from/to the dielectric case.

16. The device of claim 15,
wherein the hybrid connector has a galvanic connector configured to provide/receive power to a connector in the dielectric case.

17. A hybrid connector for connecting to a device with a dielectric case, comprising:
an integrated circuit (IC) configured to produce/receive a millimeter wave signal;
an antenna connected to the IC configured to radiate/receive the millimeter wave signal; and
a hybrid connector waveguide configured to guide the radiated/received millimeter wave signal from/to the dielectric case to facilitate the communication between the hybrid connector and the IC in the device;
wherein the hybrid connector waveguide is tilted at a tilt angle from an axis perpendicular to the dielectric case, wherein the tilt angle is greater than a critical angle of the dielectric case.

18. The hybrid connection of claim 17, further comprising
a galvanic connector configured to provide/receive power to a connector in the device.

19. The hybrid connection of claim 17,
wherein the antenna is one of a dipole antenna, a patch antenna, a Yagi-Uda antenna, and a Vivaldi antenna.

20. The hybrid connection of claim 17, further comprising
a dielectric case antenna configured to couple the millimeter wave signal from the hybrid connector waveguide into the dielectric case.

21. A device, comprising:
a dielectric case or chassis;
a first integrated circuit (IC) configured to produce a millimeter wave signal;
a first IC antenna configured to receive the millimeter wave signal from the IC and radiate the millimeter wave signal; and
a first waveguide configured to guide the radiated millimeter wave signal to the dielectric case,
wherein the millimeter wave signal is coupled into the dielectric case;
a second waveguide configured to receive the millimeter wave signal from the dielectric case and to guide the millimeter wave signal from the dielectric case;
a second IC antenna configured to receive the millimeter wave signal from the second waveguide; and
a second IC configured to receive the millimeter wave signal from the second IC antenna.

22. A device, comprising:
a dielectric case or chassis;
a first integrated circuit (IC) configured to produce a millimeter wave signal;
a first IC antenna configured to receive the millimeter wave signal from the IC and radiate the millimeter wave signal; and
a first waveguide configured to guide the radiated millimeter wave signal to the dielectric case,
wherein the millimeter wave signal is coupled into the dielectric case;
wherein the first waveguide is a dielectric waveguide tilted at a tilt angle from an axis perpendicular to the dielectric case; and wherein the tilt angle is greater than a critical angle of the dielectric case.

* * * * *